(12) United States Patent
Moriyama et al.

(10) Patent No.: US 6,430,710 B1
(45) Date of Patent: Aug. 6, 2002

(54) DATA PROCESSING SYSTEM WITH RAS DATA ACQUISITION FUNCTION

(75) Inventors: Takashi Moriyama; Masahide Tsuboi; Tetsuo Hiramitsu, all of Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/265,865

(22) Filed: Mar. 11, 1999

(30) Foreign Application Priority Data

Mar. 12, 1998 (JP) .......................................... 10-061461

(51) Int. Cl.$^7$ ........................... G06F 11/30; G06F 13/00
(52) U.S. Cl. ...................... 714/43; 710/109; 710/306; 710/311
(58) Field of Search .............................. 714/43, 56, 30, 714/47; 710/109, 110, 305, 306, 311; 370/402

(56) References Cited

U.S. PATENT DOCUMENTS 5,742,753 A * 4/1998 Nordsieck et al. ............ 714/11
6,000,043 A * 12/1999 Abramson ..................... 714/44
6,094,674 A * 7/2000 Hattori et al. ............... 709/203

FOREIGN PATENT DOCUMENTS

JP 405127949 A * 5/1993 ........... G06F/11/34

* cited by examiner

*Primary Examiner*—S Baderman
(74) *Attorney, Agent, or Firm*—Mattingly, Stanger & Malur, P.C.

(57) ABSTRACT

In an information processing system having a bus bridge connected between a plurality of buses for data transfer therebetween, the bus bridge is provided with a RAS data acquisition bus operating independently from the plurality of buses and a RAS data acquisition circuit for acquiring RAS data, the RAS data acquisition circuit acquires RAS data in the bus bridge or RAS data of a processor or an I/O device on a bus connected to the bus bridge, in response to a command supplied from an external circuit via the RAS data acquisition bus. The RAS data acquisition circuit sends the acquired RAS data to the external circuit via the RAS data acquisition bus.

10 Claims, 4 Drawing Sheets

FIG. 3

| 0 × × × × × × × | NO OPERATION (ACCESS TERMINATION) |
|---|---|
| 1 0 0 0 0 0 0 0 | READ REGISTER IN BUS BRIDGE |
| 1 0 0 0 0 0 0 1 | WRITE REGISTER IN BUS BRIDGE |
| 1 0 0 0 0 0 1 0 | READ PCI BUS CONFIGURATION SPACE |
| 1 0 0 0 0 0 1 1 | WRITE PCI BUS CONFIGURATION SPACE |
| 1 0 0 0 0 1 0 0 | READ PCI BUS I/O SPACE |
| 1 0 0 0 0 1 0 1 | WRITE PCI BUS I/O SPACE |
| 1 0 0 0 0 1 1 0 | READ PCI BUS MEMORY SPACE |
| 1 0 0 0 0 1 1 1 | WRITE PCI BUS MEMORY SPACE |
| 1 0 0 0 1 0 0 0 | READ HOST BUS MEMORY SPACE |
| 1 0 0 0 1 0 0 1 | WRITE HOST BUS MEMORY SPACE |

…

DATA PROCESSING SYSTEM WITH RAS DATA ACQUISITION FUNCTION

BACKGROUND OF THE INVENTION

The present invention relates to techniques of acquiring RAS (reliability/availability/serviceability) data useful for fault recovery of an information processing system with a bus bridge which is connected between a plurality of buses for data transfer therebetween, for example, between a primary bus and a secondary bus such as between a host bus and a PCI bus and between a processor bus and an I/O bus of a server system.

A main portion of a conventional information processing system having a bus bridge connected between a host bus and a PCI bus of a server system will be described with reference to FIG. 4.

Referring to FIG. 4, reference numeral 1 represents a host bus, and reference numeral 2 represents a PCI bus widely used with personal computers nowadays. Reference numeral 3 represents a bus bridge which is connected between the host bus 1 and PCI bus 2 to transfer data therebetween. This bus bridge 3 is constituted of a host bus control circuit 31 for controlling the host bus 1, a PCI bus control circuit 32 for controlling the PCI bus 2, and a host bus—PCI bus I/F control circuit 33.

Symbol s11 represents a transfer start request signal which is used for sending a data transfer start request from the host bus 1 to the host bus—PCI bus I/F control circuit 33. Symbol s12 represents a transfer completion signal indicating a data transfer completion. Symbol s13 represents a transfer address signal indicating a data transfer partner. Symbol s14 represents transfer data. Symbol s21 represents a transfer start request signal which is used for sending a data transfer start request from the PCI bus 2 to the host bus—PCI bus I/F control circuit 33. Symbol s22 represents a transfer completion signal indicating a data transfer completion. Symbol s23 represents a transfer address signal indicating a data transfer partner. Symbol s24 represents transfer data.

In such an information processing system, data at some address on the PCI bus 2 requested from the host bus 1 side is read in the following manner. First, in response to the request from the host bus 1, the host bus control circuit 31 enables the transfer start request signal s11 to request the host bus—PCI bus I/F control circuit 33 to transfer data at an address indicated by the signal s13. This request is received by the host bus—PCI bus I/F control circuit 33 and thereafter executed for the PCI bus 2. After the data transfer is completed by the PCI bus 2, the host bus—PCI bus I/F control circuit 33 sends the transfer completion signal s12 to the host bus control circuit 31 to terminate the data transfer.

A data transfer start request from the PCI bus 2 side to the host bus 1 is executed in the following manner. Namely, in response to the request from the PCI bus 2, the PCI bus control circuit 32 enables the transfer start request signal s21 to request the host bus—PCI bus I/F control circuit 33 to transfer data at an address indicated by the signal s23. This request is received by the host bus—PCI bus I/F control circuit 33 and thereafter executed for the host bus 1. After the data transfer is completed by the host bus 2, the host bus—PCI bus I/F control circuit 33 sends the transfer completion signal s22 to the PCI bus control circuit 32 to terminate the data transfer.

In the conventional information processing system described above, the bus bridge 3 is provided with only a bus bridging function of transferring data between the primary bus and secondary buses, in this example, between the host bus 1 and PCI bus 2. Therefore, in order to acquire RAS data in the bus bridge 3 or RAS data of I/O devices and the like on the secondary bus or PCI bus 2 connected to the bus bridge 3, it is necessary to intercept the program presently run by a processor of the system and execute a RAS data acquisition program. It is not easy, therefore, to acquire RAS data.

Furthermore, if the program run by the processor enters an infinite loop or the processor falls in an inoperable state such as hang-up, the processor cannot execute the RAS data acquisition program and the RAS data acquisition itself is impossible.

RAS data is useful for facilitating to find the reason of an abnormal operation of a system. If RAS data is not easy to acquire or is impossible to acquire, it means that it takes a time to recover a fault of the system. This problem has long been desired to be solved.

SUMMARY OF THE INVENTION

The present invention has been made under the above-described circumstances and an object of the invention is to provide a RAS data acquisition circuit and an information processing system with this circuit capable of facilitating to find the reason of an abnormal operation of the system and easily recovering a fault of the system.

The above object can be achieved by an information processing system having a bus bridge connected between a plurality of buses for data transfer therebetween, wherein the bus bridge is provided with a RAS data acquisition bus operating independently from the plurality of buses and an RAS data acquisition unit for acquiring RAS data in the bus bridge or RAS data of a processor or an I/O device on a bus connected to the bus bridge, in response to a command supplied from an external circuit via the RAS data acquisition bus.

The information processing system is also provided with an information transmitting unit for transmitting the RAS data acquired by the RAS data acquisition unit to the external circuit via the RAS data acquisition bus.

RAS data of a processor or an I/O device on a bus is acquired via the RAS data acquisition bus which operates independently from a plurality of buses to and from which data is transferred via the bus bridge. It is therefore possible to acquire RAS data easily without intercepting a program presently run by a processor of the system, and to know the operation state of the I/O device in real time.

Further, the RAS data acquisition bus is provided outside of the bus bridge and the RAS data can be acquired without the help of the processor of the system. Therefore, RAS data can be acquired even if the program run by the system enters an infinite loop or the system falls in an inoperable state such as hang-up. Accordingly, it is easy to find the reason of an abnormal state of the system and to recover a fault of the system.

BRIEF DESCRIPTION OF THE DRAWINGS

FIG. 3 is a table showing examples of commands used by the embodiment.

DETAILED DESCRIPTION OF THE PREFERRED EMBODIMENTS

An embodiment of the invention will be described with reference to the accompanying drawings.

Figure 1:
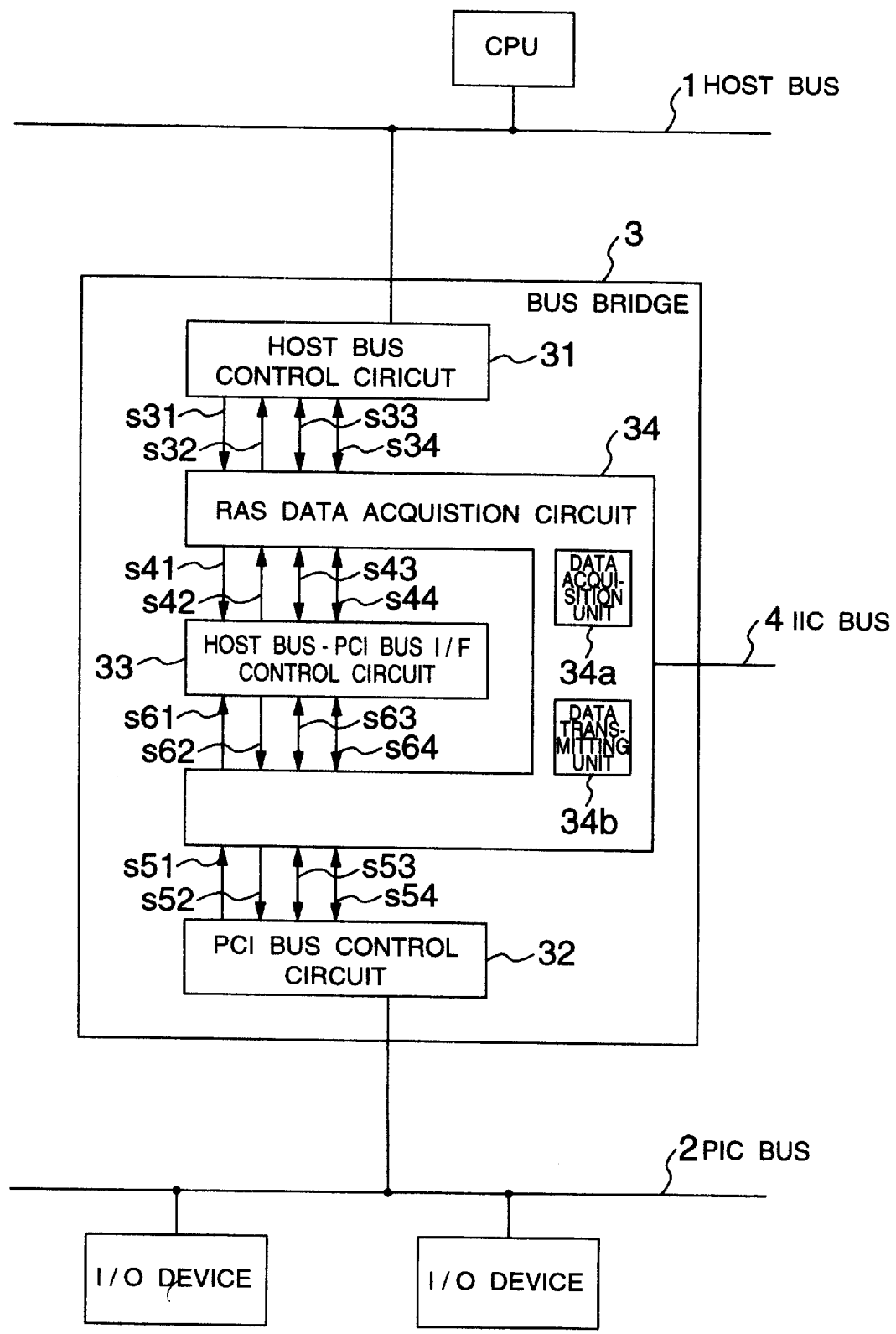
FIG. 1 a block diagram showing the main portion of an information processing system with an interbus control circuit including a RAS data acquisition circuit according to an embodiment of the invention.

FIG. 1 is a block diagram showing the main portion of an information processing system with a RAS data acquisition circuit according to the embodiment of the invention.

Figure 4:
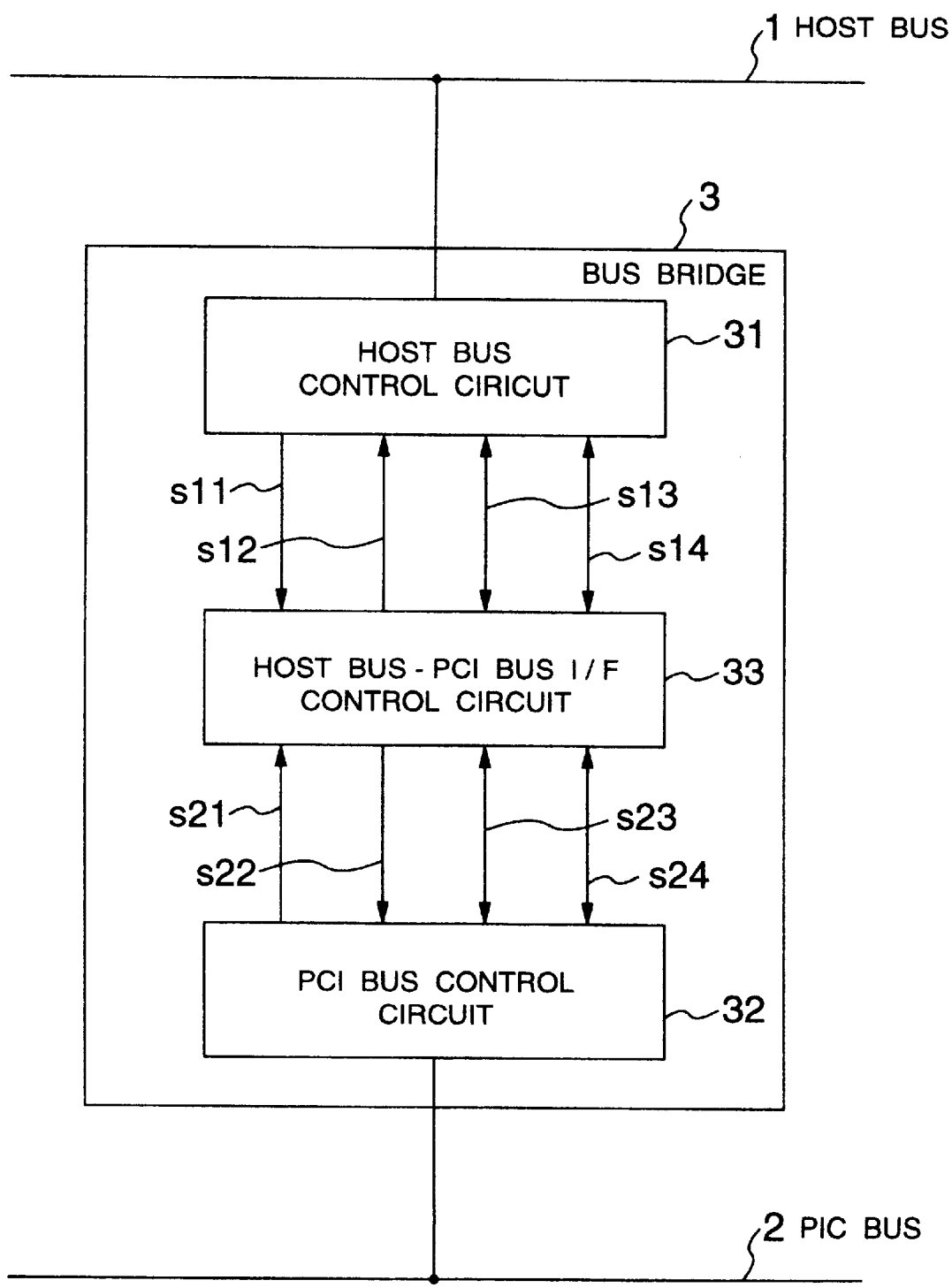
FIG. 4 is a block diagram showing the main portion of a conventional information processing system with a bus bridge for data transfer between a plurality of buses.

In FIG. 1, reference numerals 1 and 2 represent a host bus and a PCI bus similar to those shown in FIG. 4. Reference numeral 3 represents a bus bridge similar to that shown in FIG. 4. However, in this embodiment, the bus bridge 3 has a RAS data acquisition circuit 34, in addition to a host bus control circuit 31 for controlling the host bus 1, a PCI bus control circuit 32 for controlling the PCI bus 2, and a host bus—PCI bus I/F control circuit 33. The bus bridge 3 is connected between the host bus 1 and PCI bus 2 for data transfer therebetween. A CPU for processing data is connected to the host bus 1, and I/O devices are connected to the PCI bus 2.

As described above, the bus bridge 3 is also provided with the RAS data acquisition circuit 34 which can send RAS data to an external circuit.

Reference numeral 4 represents a RAS data acquisition bus, for example, an IIC (inter IC) bus, operating independently from the buses 1 and 2 and extending from the bus bridge 3 to the external circuit. One end of the IIC bus is connected to the RAS data acquisition circuit 34, and the other end is connected to an external circuit, e.g., a RAS data analysis unit (not shown).

The RAS data acquisition circuit 34 has a data acquisition unit 34a and a data transmitting unit 34b. The data acquisition unit 34a acquires RAS data in the bus bridge or RAS data of each processor and each I/O device on the buses 1 and 2 connected to the bus bridge 3, in response to a command sent from an external circuit, e.g., the RAS data analysis unit via the IIC bus 4. The data transmitting unit 34b transmits RAS data acquired by the data acquisition unit 34a to an external circuit.

Symbol s31 represents a transfer start request signal which is used for sending a data transfer start request from the host bus 1 to the RAS data acquisition circuit 34. Symbol s32 represents a transfer completion signal indicating a data transfer completion. Symbol s33 represents a transfer address signal indicating a data transfer partner. Symbol s34 represents transfer data. Symbol s41 represents a transfer start request signal which is used for sending a data transfer start request from the RAS data acquisition circuit 34 to the host bus—PCI bus I/F control circuit 33. Symbol s42 represents a transfer completion signal indicating a data transfer completion. Symbol s43 represents a transfer address signal indicating a data transfer partner. Symbol s44 represents transfer data.

Symbol s51 represents a transfer start request signal which is used for sending a data transfer start request from the PCI bus 2 to the RAS data acquisition circuit 34. Symbol s52 represents a transfer completion signal indicating a data transfer completion. Symbol s53 represents a transfer address signal indicating a data transfer partner. Symbol s54 represents transfer data. Symbol s61 represents a transfer start request signal which is used for sending a data transfer start request from the RAS data acquisition circuit 34 to the host bus—PCI bus I/F control circuit 33. Symbol s62 represents a transfer completion signal indicating a data transfer completion. Symbol s63 represents a transfer address signal indicating a data transfer partner. Symbol s64 represents transfer data.

Figure 2:
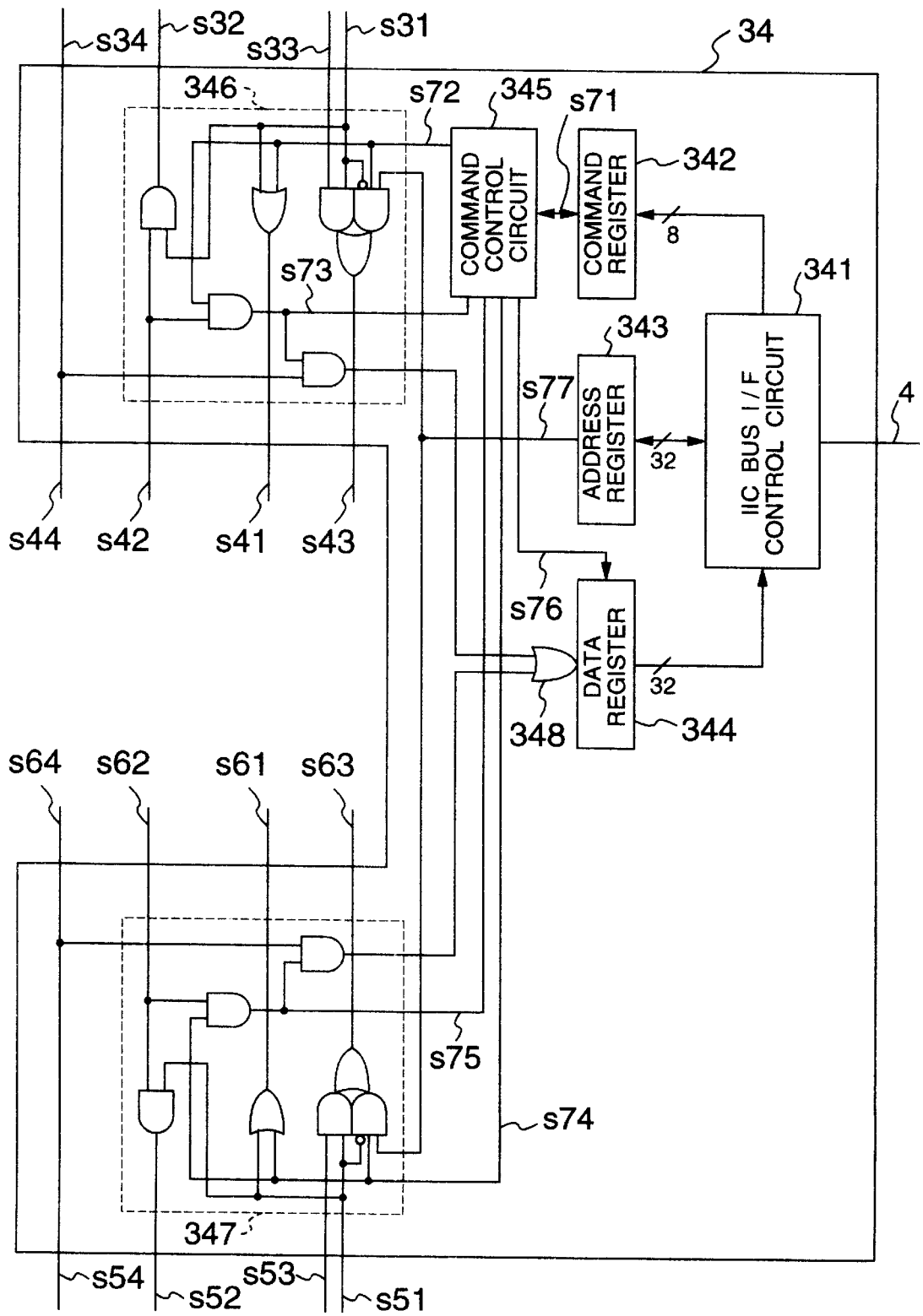
FIG. 2 is a circuit diagram showing a specific example of the RAS data acquisition circuit shown in FIG. 1.

FIG. 2 is a circuit diagram showing a specific example of the RAS data acquisition circuit 34 shown in FIG. 1.

As shown in FIG. 2, the RAS data acquisition circuit 34 (data acquisition unit 34a, data transmitting unit 34b) is constituted of an IIC bus I/F control circuit 341, a command register 342, an address register 343, a data register 344, a command control circuit 345, and logic circuits 346 to 348.

The IIC bus I/F control circuit 341 receives from the IIC bus 4 an address and a command to be accessed when RAS data is to be acquired from the IIC bus 4, or sends desired read (acquired) data to the IIC bus 4. The command register 342, address register 343, and data register 344 temporarily store a command, address, and data, respectively. The command register 342 can rewrite a command via the IIC bus 4, and the data register 344 can read data via the IIC bus 4. The command control circuit 345 executes and controls a command written in the command register 342, and controls the rewriting of data in the data register 344. The logic circuits 346 to 348 select either a normal operation or a RAS data acquisition operation. In the normal operation, the bus bridge 3 transfers data between the buses 1 and 2, whereas in the RAS data acquisition operation, the RAS data acquisition circuit 34 and IIC bus 4 are made to operate. For example, when an access occurs from the host bus 1 to the bus bridge 3, the normal operation is enabled, or when, instead of such an access, an access occurs from the IIC bus 4 to the bus bridge 3 (RAS data acquisition circuit 34), the RAS data acquisition operation is enabled. In FIG. 2, identical symbols to those shown in FIG. 1 represent similar components.

FIG. 3 is a table showing examples of commands used by the above-described circuits and system of the invention.

Commands "10000000" and "10000001" are commands used for acquisition of RAS data in a register of the bus bridge. Commands "10000010" and "10000011" are commands used for acquisition of PCI bus configuration data. Commands "10000100" and "10000101" are commands used for acquisition of RAS data in the PCI bus I/O space. Commands "10000110" and "10000111" are commands used for acquisition of RAS data in the PCI bus memory space. Commands "10001000" and "10001001" are commands used for acquisition of RAS data in the host bus memory space, and a command "0******" is a command representative of no operation of RAS data acquisition.

Next, with reference to FIGS. 1 to 3, the operations of the above-described circuits and system of the invention will be described.

In the following, an operation of reading (acquiring) data (RAS data) in the configuration space of the PCI bus 2 from the IIC bus 4 will be described by way of example.

A RAS data acquisition circuit control unit (not shown) of the RAS data analysis unit first writes an address to be accessed in the address register 343 via the IIC bus 4, and then writes the PCI bus configuration space read command "10000010" (refer to FIG. 3) in the command register 342. In this manner, the contents of the command register 342 are input via a signal s71 to the command control circuit 345, so that a RAS data acquisition request signal s72 is enabled. If the transfer start request signal s31 from the host bus control circuit 31 is in a disabled state at this time, the RAS data acquisition request signal s72 enables the transfer start request signal s41 for the host bus—PCI bus I/F control circuit 33, and the contents (address signal s77) of the address resister 343 are supplied to the transfer address signal s43.

After the processes for the transfer start request are completed on the PCI bus 2, the transfer completion signal s42 from the host bus—PCI bus I/F control circuit 33 to the RAS data acquisition circuit 34 is enabled and desired data (in this case, data in the PCI bus configuration space) is sent to the RAS data acquisition circuit 34. In the RAS data acquisition circuit 34, a transfer completion signal s73 is enabled by the RAS data acquisition request signal s72 output from the command control circuit 345, and input to the command control circuit 345. The command control circuit 345 enables a data set signal s76 by using the enabled transfer completion signal s73, and sets the data (desired data) s44 read from the PCI bus 2 via the logical circuits 346 and 348 to the data register 344. Then, the command control circuit 345 clears the highest bit (b7) in the command register 342 to "0".

After the RAS data acquisition circuit control unit reads the command register 342 via the IIC bus 4 and confirms that the highest bit was cleared to "0", it reads the data register 344 to obtain the desired data s44. In this manner, the RAS data analysis unit can read (acquire) data (RAS data) in the configuration space on the PCI bus 2 via the IIC bus 4.

An access from the IIC bus 4 to spaces other than the PCI bus configuration space, such as a PCI bus I/O space and a host bus memory space, or the register in the bus bridge (refer to FIG. 3), can also be executed by processes similar to the above-described processes. Therefore, the RAS data acquisition circuit 34 can read (acquire) RAS data in the PCI bus I/O space, host bus memory space, or register in the bus bridge.

In the above embodiment, although the host bus 1 and PCI bus 2 are connected to the bus bridge 3, other buses may be connected thereto. For example, PCI buses 2 may be connected to the bus bridge, host buses 1 may be connected thereto, or a micro channel bus or an ISA bus may be connected thereto. Although the IIC bus 4 is used as the RAS data acquisition bus, other buses may also be used.

Further, the RAS data acquisition bus (IIC bus) 4 is not limited only to the connection thereof to the RAS data analysis unit. A unit for controlling the RAS data acquisition circuit 34 via the RAS data acquisition bus (IIC bus) 4 may be a circuit using, for example, a micro controller or a LAN-operating system management card. The RAS data acquisition circuit 34 may be controlled by connecting a personal computer independently from the system.

As described so far, according to the present invention, RAS data is acquired via the RAS data acquisition bus which operates independently from a plurality of buses to and from which data is transferred via the bus bridge. It is therefore possible to acquire RAS data easily without intercepting a program presently run by the system. Further, the RAS data acquisition bus is provided outside of the bus bridge and the RAS data can be acquired without the help of the system. Therefore, RAS data can be acquired even if the program run by the system enters an infinite loop or the system falls in an inoperable state such as hang-up. According to the present invention, therefore, it is easy to find the reason of an abnormal state of the system and to recover a fault of the system.

What is claimed is:

1. A data processing system with a RAS (reliability/availability/serviceability) data acquisition function, comprising:

a processor for processing data;

a host bus connected to said processor;

an I/O device;

an I/O bus connected to said I/O device; and an interbus control circuit for interconnecting said host bus and said I/O bus for data transfer therebetween, said interbus control circuit including a RAS data acquisition circuit for acquiring signals received by said interbus control circuit as RAS data.

2. A data processing system according to claim 1, wherein said interbus control circuit further comprises a third bus operating independently from said host bus and said I/O bus, for sending the RAS data to an external circuit.

3. A data processing system according to claim 2, wherein said interbus control circuit receives a RAS acquisition command from the third bus.

4. A data processing system according to claim 2, wherein said interbus control circuit further includes a logic circuit which enables either a normal operation of data transfer between said host bus and said I/O bus or a RAS data acquisition operation of said RAS data acquisition circuit.

5. A data processing system according to claim 4, further comprising a command control circuit for making said logic circuit enable the RAS data acquisition operation, in response to reception of a RAS data acquisition command when there is no access from said host bus or said I/O bus.

6. A data processing system with a RAS (reliability/availability/serviceability) data acquisition function, comprising:

first and second buses; and an interbus control circuit for interconnecting said first and second buses for data transfer therebetween, said interbus control circuit including a RAS data acquisition circuit for acquiring signals received by said interbus control circuit as RAS data.

7. A data processing system according to claim 6, wherein said interbus control circuit further comprises a third bus operating independently from said first and second buses, for sending the RAS data to an external circuit.

8. A data processing system according to claim 7, wherein said interbus control circuit receives a RAS acquisition command from the third bus.

9. A data processing system according to claim 8, wherein said interbus control circuit further includes a logic circuit which enables either a normal operation of data transfer between said first and second buses or a RAS data acquisition operation of said RAS data acquisition circuit.

10. A data processing system according to claim 9, further comprising a command control circuit for making said logic circuit enable the RAS data acquisition operation, in response to reception of the RAS data acquisition command when there is no access from said first bus or said second bus.

* * * * *